Aug. 25, 1953
M. MACCAFERRI
2,649,708
REED TESTER
Filed Dec. 26, 1950
2 Sheets-Sheet 1
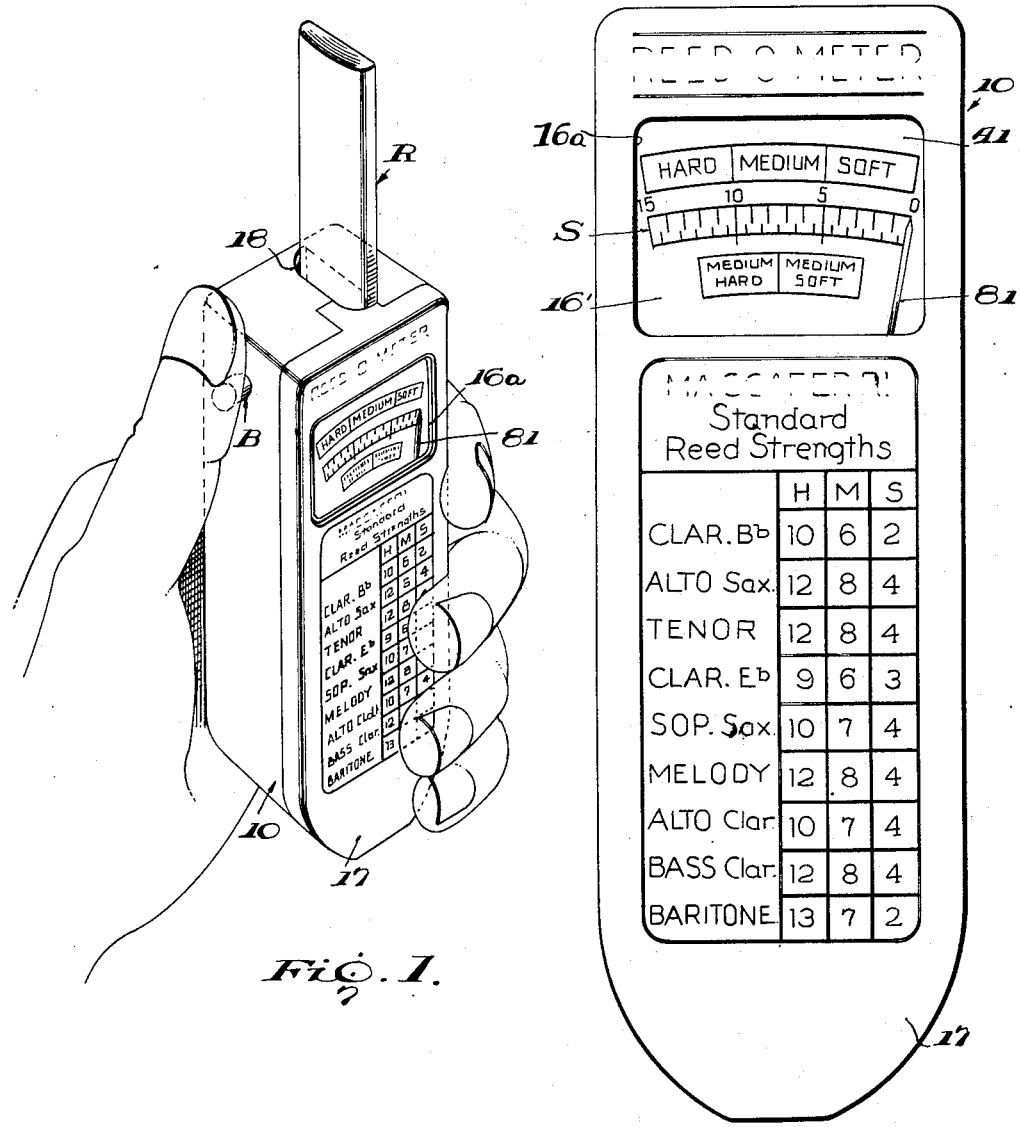
INVENTOR:
Mario Maccaferri
BY Peck + Peck.
ATTORNEYS

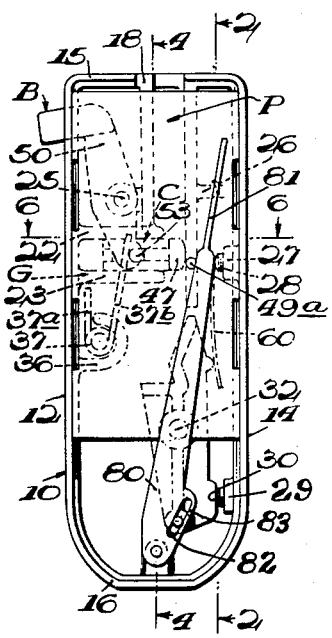

Patented Aug. 25, 1953

2,649,708

UNITED STATES PATENT OFFICE 2,649,708

REED TESTER

Mario Maccaferri, Rye, N. Y.

Application December 26, 1950, Serial No. 202,695

6 Claims. (Cl. 73—100)

This invention relates more specifically to a testing instrument for determining and indicating visually certain characteristics of reeds for musical instruments; and the nature and objects of the invention will be readily recognized and understood by those skilled in the arts involved in the light of the following explanation and detailed description of the accompanying drawings illustrating what I at present consider to be a preferred embodiment and mechanical expression of my invention from among various other forms, embodiments, arrangements, combinations and constructions of which the invention is capable within the broad spirit and scope thereof as defined by the appended claims.

With those types of musical instruments, such as instruments in the so-called wood wind classes, a vibratory reed is utilized. Such a reed is usually formed of a natural cane material, but may, if desired, be formed of plastics or other material suitable for the purpose. The reed is characterized by a membrane portion formed by grinding or cutting away one side of the reed blank to form a tapered membrane portion terminating in a very thin vibratory tip. The side of the reed opposite said tapered, membrane forming side is usually formed flat to present a planar surface from end to end of the reed. A critical characteristic of these reeds is the degree of flexibility of the membrane portion, that is, the so-called "hardness" or "softness" characteristic of the reed. In use in a musical instrument the reed may after a period of time lose its efficiency musically due to a change in the desired degree of reed flexibility, so that it becomes desirable or necessary to replace the deficient reed with a new one having the required characteristics. It is helpful to a musician to be able to accurately, positively test a used reed which appears to need replacement, as a check on his judgment. In addition, while new reeds are graded and classified by the manufacturer and such grading is marked on the reed or on the package in which it is contained, a musician may himself wish to check a new reed to determine its suitability for his particular instrument or needs.

It is a primary object of my invention to provide a simple, inexpensive, precision testing instrument which may be used to accurately test a musical instrument reed for its flexibility or vibratory characteristics.

It is a further object to provide a compact reed testing instrument in a form which may be readily carried on the person of a musician, or in an instrument case, or in some other convenient location, and which will be of a size to be readily held in the hand for insertion of a reed to be tested and during testing of the reed.

A further object is to provide a reed testing instrument of a design and construction which may be subjected to handling and normal usage without impairing the precision of operation and accuracy of results of the instrument.

Another object is to provide such an instrument in which a reed may be inserted and instantly tested by the operation of but a single member to thereby eliminate the necessity for the precise, coordinated adjustment of a plurality of members in order to obtain a test result.

Another object is to provide such an instrument of a design in which the major components thereof may be formed of a suitable molded thermoplastic material.

Another object is to provide such an instrument with which there may be instantly obtained an accurate, clearly legible indication on a suitably calibrated scale incorporated in the instrument, of the flexibility characteristics of a musical instrument reed.

A further object is to provide for such an instrument an arrangement of chart of standards of degrees of hardness for specified types of reeds, together with a scale and pointer needle for visually indicating the degree of hardness of an instrument being tested or gauged.

With the foregoing and various other objects, features and results in view, which others will be readily recognized from the following detailed explanation, my invention consists in certain novel features in design and construction of parts and elements, and in combinations and subcombinations thereof, as will be more fully referred to and specified hereinafter.

Referring to the accompanying drawings in which similar reference characters refer to corresponding parts and elements throughout the several figures thereof.

Fig. 1 is a perspective view showing the instrument of the example embodiment held in the left hand with the thumb holding the push button depressed to condition the instrument to receive a reed for testing.

Fig. 2 is a view in elevation of the front or forward side of the instrument showing the standards chart and indicating scale.

Fig. 3 is a longitudinal section through a tester of my invention with the cover plate and scale or indicator plate removed, the reed receiving and flexing mechanism and finger button for actuating the same being shown in normal, inactive position.

Fig. 4 is a longitudinal section through the tester instrument of Fig. 1, but with the cover plate and indicator plate being shown in assembled mounted position, the essential view having been taken as on the line 2—2 of Fig. 3.

Fig. 5 is a longitudinal section through the instrument of Figs. 1 and 2, taken as on the line 3—3 of Fig. 4 and showing a reed inserted in the instrument in testing position under flexure.

Fig. 6 is a view similar to Fig. 2 but taken as on the line 4—4 of Fig. 3.

Fig. 7 is a view in top plan or end elevation of the reed receiving end of the instrument of Fig. 1.

Fig. 8 is a transverse section through the instrument of Fig. 1 taken as on the line 6—6 of Fig. 3.

Fig. 9 is a view in elevation of the inner side of the inner wall of the instrument.

I have selected, and disclosed and described herein, a form and design of musical instrument reed tester embodying the principles and features of my invention, of a type adapted to be conveniently grasped and held in one hand for operation not only to insert a reed for testing therein but also for reading by the operator of the visually indicated characteristics of the reed from an arrangement of scale and indicator needle, while the instrument is still grasped in the hand. The form of tester instrument of the selected example, is of a design and construction intended primarily for fabrication in its major components from a suitable thermoplastic, moldable material, such as a cellulose acetate plastic. While the instrument may be said to find its preferred expression in the hand or so-called "pocket" type, I do not intend to thereby limit my invention to such types, as the principles and the several features thereof may be expressed or carried out in testing instruments of larger size for not only testing musical instrument reeds but also for testing equivalent characteristics in other types of flexible components or articles. Also, while the illustrated example is designed and constructed to be fabricated mainly as to most of its components from a plastic material, it will be obvious that if desired or found expedient, such instrument may be fabricated from other materials, and hence I do not desire nor intend to limit the fabrication of instruments embodying my invention to plastics.

In the example embodiment, the testing instrument of the invention may comprise a case 10 molded of a suitable cellulose acetate plastic, to include a rear or back wall 11, opposite side or edge walls 12 and 14, and opposite end or top and bottom walls 15 and 16, respectively. The case 10 provides an open, forward side which is closed by a front wall or cover plate 17 formed of the cellulose acetate plastic and suitably secured thereon and thereover, as for example by cementing into assembled position to form the closed case. Cover wall or plate 17 provides therein adjacent the upper end thereof, a suitable sight or window opening 16a which may mount therein and thereacross a transparent window pane 16' formed of glass or any other satisfactory transparent material for the purpose. The top or upper end wall 15 is formed with a suitably shaped slot or opening 18 therein for receiving therethrough a reed R for insertion into the instrument into position for testing (see Figs. 5 and 7). A push button B for conditioning the instrument to receive a reed R and for effecting testing operation thereof, is suitably pivotly mounted within the instrument in position projected outwardly through a suitable opening 12a in side wall 12, which happens to be, in this instance, the left-hand side wall when facing the instrument.

The width and thickness dimensions of the case 10 are such that the case may be readily held in one hand in position grasped between the fingers and the heel of the thumb of the holding hand, with the rear or back wall 11 resting across the palm of the hand and the thumb of the hand positioned for depressing the button B, as shown by Fig. 1. In this example, case 10 is designed and arranged for holding in the left-hand to thus leave the right-hand free for inserting and removing a reed R to be tested. Obviously, the case 10 can be designed to place the button B at the right-hand side of the case for holding in the right hand, or the case of the example can, if desired, be held and readily operated in the right hand by grasping the case between the heel of the thumb and the fingers, with the fingers located at the left-hand side of the case and the button B accessible for finger depression. The length dimension of the case 10 may be such that when the instrument is held in proper position for operation in the hand, the opposite ends of the case project outwardly beyond the hand. When properly grasped and held in the hand, the sight or window opening 16a in the front wall of cover plate 17 is thus completely exposed and unobstructed for quick, precise visual reading from the scale S provided at the inner or rear side of the opening. In Fig. 1 of the drawings the testing instrument is shown in position grasped in the left hand for a reed testing operation.

The case 10 provides molded integrally with the back wall 11 and upper end or top wall 15, the spaced, parallel walls 20 and 21 which extend inwardly from the inner side of top wall 15 at opposite sides of the reed receiving slot 18. The walls 20 and 21 are disposed in planes generally normal to the plane of top wall 15, and define therebetween an inwardly extending receiving passage P in continuation of and opening at its outer end through top wall slot 18. In this example, wall 21 has a greater length than wall 20 and extends a distance further into the case than does wall 20. Wall 20 is located facing button opening 12a in side wall 12 and is joined at its inner end with the uppermost wall or rib 22 of a pair of spaced parallel ribs 22 and 23 molded integral with back wall 11 and side wall 12, from which they extend inwardly a distance transversely across the case to terminate at their inner ends in a plane positioned a distance inwardly slightly beyond the vertical plane of the inner side surface of wall 20, as will be clear by reference to Figs. 2 and 5. These spaced walls 22 and 23 form a guide or slideway G for mounting and reciprocally constraining therewithin, a reed clamping jaw unit C.

A boss 24 (see Fig. 6) is formed integrally with and extends inwardly from back wall 11 in the corner area defined between the outer sides of wall 20 and wall 23. In this instance, boss 24 joins and is formed integrally with the adjacent portions of walls 20 and 23. Boss 24 is formed with an axial bore therein opening through the inner end thereof for receiving and mounting a pivot pin 25. The thickness or depth of ribs 22 and 23 is substantially less than the width of walls 20 and 21, which latter extend for substantially the full depth of the case 10. The boss 24 has a length or depth substantially greater than the depth of the guideway forming walls or ribs 22 and 23, so that, the boss projects inwardly a distance beyond such ribs and, in effect, overhangs the slide or guideway G formed by such ribs.

At the outer side of walls 21 there is formed thereacross integrally therewith a rib 26 having a transversely convex outer edge surface. This rib is located on and across the outer surface of wall 21 intermediate the top wall 15 and the inner end of wall 21, being disposed transversely thereacross but terminating at its inner end spaced a distance inwardly from the forward edge of wall 21. A boss 27 is formed integrally with case side-wall 14 and projects from the inner side thereof at a location in case 10 intermediate the transverse rib 26 of wall 21 and the inner end of that wall, as clearly shown in Figs. 3 and 5. Boss 27 is formed with a tapped, axial bore therethrough which also extends outwardly through the side wall 14. A stop screw 28 is threaded inwardly through the bore of wall 14 and boss 27 to a position with its inner end projected inwardly a slight distance beyond the inner end of the boss. The screw 28 is adjustable to the extent of projection of the inner end thereof into the case in the space between wall 21 and the outer side wall 14. A short rib 26a is molded integrally with wall 21 and projects outwardly from the outer side of that wall, and inwardly a limited distance transversely thereof from back wall 11, parallel with the long rib 26. This rib 26a is positioned spaced a distance inwardly from rib 26, adjacent but spaced from the inner end of wall 21, as will be clear by reference to Fig. 3. The function of the rib 26 and the short rib 26a will be referred to and explained hereinafter.

At the lower end of side wall 14, spaced a distance above bottom wall 16 a boss 29, similar to the boss 27, is formed integrally with said wall 14 and projects inwardly from the inner surface thereof. This boss 29 is formed with a tapped, axial bore therethrough which is extended through wall 14 and into which there is adjustably threaded a stop screw 30 in position with its inner end projected inwardly a slight distance from boss 29.

A pivot pin mounting boss 31 (see Fig. 4) is formed integral with and is extended inwardly from the inner surface of back wall 11 with its axis disposed transverse of the case and perpendicular to the plane of back wall 11. This boss 31 is formed with an axial bore therein opening through the inner end of the boss and is adapted to mount and receive therein an end of a pivot pin 32 (see Fig. 5). This boss 31 is located, in this example, with its axis lying in a longitudinal plane parallel with wall 21 of and passing through the reed receiving passage P, but being spaced a distance inwardly from the inner surface of this wall. The boss 31 is located in position intermediate boss 29 and the inner end of wall 21.

A boss 33 is positioned at the inner side of bottom wall 16, integral with that wall, and at its rear end joins and is integral with back wall 11. This boss 33 extends forwardly across bottom wall 16, centrally thereof but terminates with its forward end spaced a distance from the front wall or cover plate 17, as shown in Figs. 4 and 6. The boss 33 is provided with a bore disposed longitudinally thereof and opening through the forward end of the boss for receiving therein a pivot pin 35 (see Fig. 5) disposed with its axis parallel with the axis of pivot pin 32 in the boss 31.

The left-hand side wall 12 of case 10 is provided with the curved wall or rib 36 molded integrally therewith and being extended inwardly from the inner side of such wall at a location spaced below the guideway G formed by the walls 22 and 23. This wall 36 at the rear side is formed integral with back wall 11 and extends inwardly a distance from such back wall across the side wall 12, to thereby form a housing open at its forward end and along its upper side, for receiving and mounting therein the body coil of a torsion spring unit 37.

The cover plate or front wall 17 is formed around the inner edges thereof with the mounting flanges 17a which are spaced apart therealong in positions to seat on and form a lap joint with the outer forward edge provided by case 10, as will be clear by reference to Figs. 2, 4 and 6 in particular. Cover plate 17 in addition to providing therein the sight opening 16a, is provided at the lower end thereof with a boss 38 which in mounted and assembled position of cover plate 17 is aligned with but spaced from the forward end of the boss 33 of case bottom wall 16. At its upper end the cover plate 17 is preferably provided with an inturned tongue portion 17b which is adapted to engage and seat in a recess 15a formed in and opening through the forward edge of case top wall 15. Tongue portion 17b serves to firmly position and locate the cover wall on the case against displacement. In this example, the tongue portion 17b at one side thereof closes the adjacent side of the reed receiving opening 18 in the top wall 15. (See Figs. 2 and 7.)

The case 10 is completed by an inner wall or plate 40 which is of rectangular plan form and which, if desired, may be molded of the cellulose acetate plastic. This inner wall 40 is seated at its opposite side edges on the forward opposite side edges of the case 10. The opposite edge portions of inner wall 40 may be suitably notched or cut out at 40a to receive therethrough the flanges 17a, respectively, of the cover wall of plate 17, to permit such flanges to engage with and seat on the adjacent portions of the forward edges of the case. Inner wall 40 is preferably secured in position on case 10 by cementing, and when in assembled position, is spaced a distance inwardly from the forward wall or cover plate 17. Wall 40 extends from the upper end of the case to terminate at its lower end spaced from the bottom wall 16 with its lower edge being opposite the boss 31 on the back plate 11. Inner wall 40 thus extends completely across sight or window opening 16a, and provides by its forward or front surface, a dial 41 on and across which there is provided the scale S. (See Fig. 9.)

The inner wall 40 has molded integrally therewith, the boss 42 having an axial bore, with this boss extended inwardly from the inner side of the wall. With wall 40 in mounted position on case 10, the boss 42 is then located with its bore in axial alignment with the bore of boss 24. (See Fig. 6.) Boss 42 receives within its axial bore the forward end of the pivot pin 28. A pair of spaced parallel walls or ribs 44 are molded integrally with inner wall 40 and extend inwardly from the inner side thereof. These ribs 44 with wall 40 in assembled position are opposite and aligned with the walls or ribs 22 and 23 on the inner side of back wall 11 of case 10, and form a slide or guideway G' for slidably receiving and mounting the forward side portion of the reciprocal clamp unit C.

A short rib 26b is molded integrally with inner well 48 and projects rearwardly therefrom in position disposed transversely thereof adjacent the right hand edge of wall 40. This short rib 26b with the inner wall 40 in mounted position on case 10, is transversely aligned but spaced from the short rib 26a so as to form a space between these ribs for a purpose to be hereinafter described. This short rib 26b also functions to brace wall 21 against wall 14 to resist pressures to which wall 21 is subjected in operation use.

In order to provide for accurate positioning of the inner wall 40 in assembled position on case 10, I provide wall 40 with a small diameter bore 49 therethrough to receive therein an accurately located circular positioning stud 49a which is molded integrally with and projects outwardly from the forward edge of wall 21. By fitting inner wall 40 on the forward side of case 10 with stud 49a received and seated in bore 49, the inner wall 40 may be located in accurate position of assembly against displacement.

The clamp unit C is, in the instrument of this example, molded from the cellulose acetate plastic to provide a slide body 45 having a recess 46 in one side thereof, together with a head or clamping jaw forming portion 47 extended across and laterally from one end of body 45. (See Fig. 8.) The outer clamping surface of jaw 47 is formed transversely curved to thereby provide a convex or rounded clamping surface 47a. (See Fig. 5.) This unit C is reciprocally mounted in position in case 10 with the body portion 45 thereof slidably received and confined between walls or ribs 22 and 23 of slideway G, and with the outer end of the head or clamping jaw 47 slidably received and confined between the ribs 44 of the slide way G'. In mounted position clamping unit C has the clamping jaw 47 located across the receiving passage P formed between walls 20 and 21, while the recess 46 of the body 45 thereof is at the front or outer side of the unit facing inner wall 40. Thus, clamp unit C is reciprocal in the guideways G—G' between an inwardly projected position located across passage P with its clamping surface 47a engaged against the inner surface 21a of wall 21, and a position retracted or moved outwardly in the guideways clear of and unobstructing passage P. The wall 21 presents the inner surface 21a thereof as a flat, planar clamping surface.

The button B forms a component of an actuating unit for reciprocating the reed clamp C between reed clamping position and a non-clamping position. Button B is molded integrally with a lever arm 50, being located at one end of arm 50 in position extended laterally therefrom. Arm 50 intermediate the button end thereof and its opposite end, has molded integrally therewith a bearing or hub forming boss 51 which, in this instance, is extended laterally outwardly beyond opposite sides of the arm. Bearing boss 51 is formed with an axial bore therethrough for receiving pivot pin 25 on which the lever arm 50 is mounted. The end 52 of lever arm 50 opposite button B is formed of a width and thickness to be operatively received in the recess 46 of the slide body 45 of clamp unit C, and is preferably rounded or curved to form surfaces for slidably engaging the surfaces presented by slide body 45 at opposite sides of the recess 46. The clamp unit engaging end 52 of lever arm 50 is formed with a pin or stud 53 molded integrally therewith and being extended laterally outwardly from one side of the arm, in this instance the inner or forward side thereof.

The clamp unit actuating lever arm 50 is pivotally mounted in assembled position on the pivot pin 25, which pin is mounted in the aligned bosses 24 and 42 on back wall 11 and inner wall 41, respectively, with pin 25 extending through the bore of the bearing boss 51. In mounted position on pin 25 button B is located at the upper end of the arm and projects laterally outwardly through the button opening 12a in the case side wall 12, while the lower end 52 of the arm is received and located in recess 46 of slide body 45 of the clamp unit C. In this assembled position, pin or stud 53 projects laterally outwardly from arm end 52 at the opposite side of the arm from the side engaged in clamp unit recess 46. Thus, depression of button B inwardly will rock lever arm 50 on pivot 25 to swing arm end 52 outwardly and thus retract the clamp unit C from its inwardly projected position, as will be clear by reference to Fig. 5. Outward projection of the button B to the position shown in Fig. 1, projects the clamp unit C inwardly across receiving passage P to clamping position engaged against surface 21a of wall 21, or against a reed membrane interposed between wall 21 and the clamping jaw 47 of clamp unit C.

The clamp unit C is spring loaded and continuously biased toward its inwardly projected, clamping position of Fig. 5, by the torsion spring unit 37. This spring unit 37 includes a coil body which is mounted and confined in the curved housing-forming wall 36 at the inner side of case wall 12, with the opposite ends of the spring providing a short spring arm 37a engaged against the inner side of wall 12 and a long spring arm 37b which is extended upwardly from the coil body and is engaged under tension against the outer side of the pin or stud 53 on the inner end 52 of button mounting arm 50. Thus mounted, spring unit 37 continuously acts to bias clamp unit C to clamping position with the button B projected outwardly through side wall 12 of the case to its normal position, as shown in Fig. 3. Depression of button B retracts clamping unit C from clamping position against the forces exerted by spring unit 37 as shown in Fig. 5. Upon release of the depressive forces applied to button B, spring unit 37 acts instantly to return clamp unit C to clamping position with resulting projection of button B outwardly to its normal position.

I provide an organization for effecting flexing of the membrane M of a reed R inserted in testing position in passage P of the case 10. This organization includes a flat, plate spring member 60 which, in this example, may be considered to be formed of tempered clock spring steel of a thickness of the order of .008 of an inch. This plate spring 60 is selected and formed to exert when bent or flexed, forces of predetermined magnitudes having a definite relationship to the range of magnitudes of forces required to flex or bend through predetermined degrees of flexure, the various reeds which the instrument is designed to test.

Spring 60 is formed transversely across one end thereof of channel shape, as shown at 61, and is mounted in the case 10 between wall 14 and the fixed jaw forming wall 21 of the reed receiving passage P, with the channel shaped end 61 of the spring being seated on and over rib 26 on wall 21. Spring 60 extends inwardly from rib 26, between and constrained against displacement by ribs 26a and 26b with set screw 28 being screwed into engagement with the spring to adjust and set the initial degree of flexure. From this fulcrum rib 26a, the spring extends on into the case with its free arm 62 terminating a distance spaced inwardly from the inner end of wall 21.

A reed membrane receiving and flexing arm unit 70 is provided and is mounted in case 10 for spring loading by the plate spring 60. This arm unit 70 is molded, in this instance, from the cellulose acetate plastic, and is formed with the bearing boss 71 molded integrally therewith intermediate the opposite ends of the arm and being extended from opposite sides thereof. Bearing boss 71 is formed with an axial bore therethrough, and the arm is pivotally or rockably mounted on the pivot pin 32 which is mounted in and extends forwardly from boss 31 on back plate 11. In assembled position, pivot pin 32 extends through the bore of boss 71 with the arm unit 70 disposed in position longitudinally of case 10 between the bottom wall 16 and the inner end of wall 21, as will be clear by reference to Figs. 3 and 5.

The inner end 72 of arm unit 70 extends inwardly along the inner side of plate spring 60 and is formed across its outer side with a transverse rib 73 which is engaged with and across the free arm 62 of spring 60 adjacent the inner free end of that arm. Arm unit 70 provides intermediate the bearing boss 71 and the inner end of the arm, a shoulder or shelf portion 74 which extends laterally from the side of the arm opposite that engaged by spring arm 62 and which is in position aligned with the receiving passage P. Thus located, the inner end of the membrane M of a reed inserted in testing position in and through passage P may engage with and be seated on shoulder 74, as shown in Fig. 5. The inner side of the arm portion 72 between the inner end thereof and the shoulder 74, is shaped to provide an inwardly extended reed engaging ridge 75 transversely thereacross. This ridge 75 forms a bearing edge which engages against the adjacent side of a reed membrane for effecting flexure of the membrane in the testing operation of the instrument.

The reed flexing arm unit 70 is spring loaded by the plate spring 60 and is constantly biased thereby toward the side wall 12 of case 10, to the position shown in Fig. 3. This position may be predetermined and set by the stop screw 30 in boss 29 of side wall 14, arm unit 70 being formed at its outer end with an abutment heel 76 which engages against stop screw 30 to determine the maximum position to which the arm unit may be biased by spring 60. Referring to Fig. 3, with arm unit 70 in its maximum position of bias by spring 60, that is its inactive, non-testing position, it will be noted that the reed membrane engaging ridge 75 is positioned in a longitudinal plane which passes through passage P, but is spaced intermediate the reed clamping surface 21a of wall 21 and the inner surface of wall 20.

The degree of rotation of arm unit 70 from its normal position of Fig. 3, against the forces of plate spring 60 in testing the degree of flexibility of a reed membrane, is visually indicated on the scale S through the medium of an indicator arm 80 which is operatively connected with the reed flexing arm unit 70. This indicator arm 80 may, as in the example hereof, be molded of the cellulose acetate plastic, and includes at its mounting end an inwardly extended bearing boss or hub 81' having an axial bore which receives the pivot pin 35 carried by boss 33 at the inner side of the bottom wall 16 of the case 10. So mounted, indicator arm 80 is swingable on pin 35 and extends upwardly or inwardly through the case 10 between the cover plate 17 and the inner wall 40, to a position with its free end in front of and swingable over and across the dial 41 and the scale S thereon. Preferably, the free end length of indicator arm 80 which extends across dial 41 is formed of reduced relatively narrow width to provide the indicator needle or pointer 81 by which the degree of angular movement of the arm 80 may be read easily and with precision from the scale S.

The indicator arm 80 is operatively coupled to the outer or lower end of the reed flexing arm unit 70 by means of a pin and slot connection which includes, a slot 82 provided in the arm 80 and a crank pin 77 formed integrally with and projecting laterally outwardly from arm 70 adjacent the lower or outer end thereof. The slot 82 is positioned on arm 80 with its longitudinal axis offset relative to the pivot pin 35 about which arm 80 rocks, and is disposed perpendicular to that axis. The axis of pin 77 is parallel with the axis of pivot pin 35 and is so located relative to pin 32 of reed flexing arm unit 70, that with the instrument in its inactive, unloaded position with button B projected, with the clamp unit C engaged against wall 21, and with the arm unit 70 in its position of maximum biasing, the indicator arm 80 is then in its position of maximum swing to the right with the indicator needle 81 thereof located at the extreme right hand side of dial 41 over the zero mark of scale S, as shown in Fig. 1.

In the example embodiment, the crank pin 77 extends at its outer end portion into and is slidably received in slot 82 of arm 80. The portion of crank pin 77 engaged in the slot 82 has an external diameter such as to have a close, running fit in the slot to thereby eliminate play between the pin and the arm 80 and prevent backlash effects on the needle 81 in the operation of the instrument. I have, in this instance, located the slot 82 immediately along and adjacent the right hand edge of arm 80, so as to form the outer wall of the slot as the relatively thin strip 83 of the cellulose acetate plastic of which the arm 80 is formed. This strip 83 (see Figs. 3 and 5) has a certain degree of spring or resilience due to its narrow width and the character of the plastic material, so that, it tends to yieldingly engage pin 77 to prevent play between the pin and the arm 80. My invention also contemplates and includes the formation of the slot 82 as being open at its lower end through the adjacent edge of arm 80, so that, the resilient strip 83 then takes the form of an arm having its lower end free, with the arm having spring characteristics to yieldingly engage the pin 77 for the purpose of eliminating play of the pin in the slot.

In the use and operation of the reed testing instrument or gauge, in the form thereof here presented, the instrument may be grasped with the case 10 held in the left hand in the manner shown in Fig. 1. The button B is in its projected position readily available for depression by the thumb of the holding hand, while the reed flexing arm unit 70 is in its position of maximum bias under the action of the plate spring 60, so that, the reed engaging ridge 75 of unit 70 is located opposite and lined-up with the inner end of passage P. In this position indicator arm 80 is at its maximum position of swing to the right, with the indicator needle 81 at the zero end of scale S. The button B may then be depressed and held in depressed position to move and hold clamp unit C in its retracted position cleared from passage P, as shown in full lines in Fig. 5. While the button B is held depressed with passage P cleared, a reed R may be held in the right hand and inserted through opening 18 and passage P with the membrane portion M thereof innermost.

The reed R may be considered to be in the usual form of such reeds for wind musical instruments, with one side of the reed flat and planar from the shank end to the tip end of membrane M. The reed R is preferably positioned in the instrument for testing merely by dropping the reed into passage P with the flat side thereof against the flat surface 21a of the wall 21, and with the button B in depressed position. As the reed R drops downwardly through passage P the tip end of the membrane M will pass across the inner surface along portion 72 of arm unit 70 until it engages the shoulder 74 of the arm unit with the reed supported thereon solely by its own weight. In such position of the reed the ridge 75 of the arm unit will then be engageable against the adjacent outer side portion of membrane M as a location spaced a distance inwardly from the membrane tip.

After insertion of the reed R to the position as above described, while the button B is depressed and passage P is cleared by clamp unit C, the thumb may be removed from button B, whereupon torsion spring unit 37 will instantly act to force clamp unit C inwardly to projected position across passage P to thereby clamp the reed in fixed position against surface 21a of wall 21. This inward projection to clamping position of unit C will also project button B outwardly to its normal position. As the reed R is clamped into position by clamp unit C the reed membrane M is forced against ridge 75 of arm unit 70 and acts to force that unit outwardly against the tension of the plate spring 60. The flexible membrane M of reed R will force arm unit 70 outwardly against plate spring 60 and will at the same time be itself flexed under the opposing forces applied thereagainst by the spring 60. The degree to which arm 70 is swung outwardly is determined by the relative flexibility of the membrane M and the opposing forces exerted thereon by plate spring 60. The degree to which the reed membrane portion M is flexed about the fulcrum provided by the clamping jaw 47 of clamp unit C will be visually indicated by the indicator needle 81, as that needle is moved to the left across scale S by the resultant swing of indicator arm 80 through its pin and slot connection with the arm unit 70. The arm unit 70 will be swung to the right and the indicator needle 80 to the left to positions which will be determined by the position of balance of the opposed forces exerted on arm 70 by plate spring 60 and by the flexed membrane portion M of the reed R. The foregoing action is effected practically simultaneously with the removal of the depressive forces applied to the button B by the thumb, so that the operator is instantly given the test reading from the position of the indicator needle 81 over scale S. Upon completion of the test reading from scale S, the button B may be again depressed to move clamp unit C from its clamping position to thereby release reed R for removal from the instrument.

I have devised a system of standard classification or graduation as to degrees of hardness for the main types of musical instrument reeds, together with a degree of hardness scale for use with the reed testing or gauging instrument of the example embodiment of my invention. Referring to Fig. 2, I have provided on the front wall or cover plate 17 of the case of the instrument, a chart listing the nine (9) major or generally used wind instrument reeds, and at the right hand side of this list I have provided three (3) columns disposed longitudinally or vertically of the instrument, with these columns identified at their upper ends as "H," "M," and "S," symbols or initials for the ranges of degrees of hardness designated as hard, medium and soft, respectively.

The three (3) vertical or longitudinal columns are divided transversely into horizontal columns or boxes opposite the reeds designated, respectively, on the chart list. In each of the boxes thus formed I may place a number which corresponds to a certain scale division or reading on the scale S on the dial 41 of the instrument, indicating a certain degree of hardness. The scale S is divided by fifteen (15) division or scale lines into scale divisions reading from the "0" division or scale line at the right-hand end of the scale, to the "15" division or scale line at the left-hand side of the scale. The divisions or spaces between the scale lines may be subdivided into one half (½) spaces or divisions by subdivision scale lines, as will be clear by reference to Fig. 2. The first five (5) divisions, that is from "0" to "5" define the soft range, and the legend "Soft" is placed on the dial 41 thereabove; the scale divisions from "5" to "10" define the medium range, and the legend "Medium" is placed thereabove on the dial 41; and the divisions from "10" to "15" define the hard range, and the legend "Hard" is placed on the dial 41 thereabove. Below the scale S, covering the range from the two and one-half (2½) subdivision line to the seven and one-half (7½) subdivision line on the scale, the legend "Medium Soft" is placed on the dial. Below the scale divisions from the seven and one-half (7½) subdivision line to the twelve and one-half (12½) subdivision line, the legend "Medium Hard" is placed on the dial 41.

The scale S is calibrated for the instrument of the example embodiment and for the reeds which it is designed to test, as listed on the chart. This calibration is made from the basis of and against selected reeds from which the standards, being the figures given on the chart, are determined, so that, a reed inserted in the instrument and flexed to a point of balance against spring 60, will result in swinging of the indicator needle 81 across scale S through an arc dependent upon the degree of hardness of that particular reed. The reed to be tested is inserted in the instrument and then flexed against spring 60 by release of the button B. Needle 81 will then be swung to and come to rest at a definite location on the scale S. Reference to the standard as shown for that reed on the chart may then be made to determine whether the reed being tested has the proper degree of hardness.

It is to be noted that the regions of the scale marked "soft," "medium soft," "medium hard" and "hard" are only approximate for average reeds. In order to obtain accurate values, the chart appearing below scale window 16 must be consulted.

My invention contemplates and includes the upward extension of the pointer 81 for the full height of the window opening 16, together with a division of the window height into nine horizontal bands. Each of these nine bands will correspond to one of the reeds listed on the chart. Thus, each horizontal band would then give direct reading, that is would be marked by the symbols indicating "soft," "medium soft" and so forth, as set forth above.

It will also be evident that various changes, modifications, variations, substitutions, eliminations and additions may be resorted to without departing from the broad spirit and scope of my invention, and, hence, I do not desire or intend to limit my invention in all respects to the exact and specific disclosures of the example form thereof herein presented, except where required clearly intended limitation thereto may appear in any of the appended claims.

What I claim is:

1. In an instrument for testing flexibility of musical instrument reeds, in combination; a case having therewithin a reed receiving and mounting passage open at its inner end; a reed flexing member pivotally mounted in said case for swinging in either direction transversely across the open inner end of said passage; said flexing member being adapted to engage one side of the inner end of a reed in said passage and being adapted by movement in one direction to flex a reed engaged thereby; spring means associated with said flexing member and being adapted to continuously bias said member in the reed flexing direction; a spring loaded clamping member normally biased to clamping position for releasably clamping a reed in testing position in said passage; and a manually operable member mounted in said case in operative engagement with said clamping member and being accessible for operation from the exterior thereof for actuating said clamping member from reed clamping position.

2. In an instrument for testing flexibility of musical instrument reeds, in combination; a case having therewithin a reed receiving passage provided along one side thereof with a reed positioning surface; a clamping member mounted for movements to and from position clamping a reed against said surface; spring means adapted to continuously bias said clamping member to clamping position; a manually operable member mounted in said casing accessible from the exterior thereof and being connected with said clamping member for moving said clamping member from a clamping to non-clamping position; a reed flexing member pivotally mounted in said case for movements in either direction transversely of a reed clamped in said passage and being adapted to engage the inner end of the reed at one side thereof for flexing the reed when moved in one direction; a spring mounted in said casing in engagement with said flexing member and being adapted to continuously move said flexing member in the reed flexing direction; and visual indicating means on said case connected with said flexing member and being operable by flexing movements thereof for indicating the flexure of a reed under the action of said flexing member.

3. In an instrument for testing the flexibility of a musical instrument reed, in combination; a case adapted to be grasped in one hand, said case having a reed receiving opening in one end thereof for insertion of a reed therethrough to testing position; means for releasably clamping a reed in testing position in said case with the inner end of the reed free for flexing; biasing means connected with said clamping means and being adapted to continuously bias said latter means to clamping position; means for moving said clamping means from clamping position, including a push button mounted in said case and being projected through a side wall in position at the exterior thereof; spring loaded means within said case adapted to engage one side of the free end of a reed secured in testing position by said clamping means for flexing the reed in one direction; and visual indicating means mounted in position visible on said case when grasped in the hand and being operable for indicating the flexure of a reed; and means connecting said visual indicating means with said reed flexing means for operation thereof by said flexing means.

4. In an instrument for testing the flexibility of a musical instrument reed, in combination; a case adapted to be grasped in one hand, said case being formed at one end thereof with a reed receiving opening for insertion of a reed therethrough to testing position in said case; means for releasably clamping a reed in testing position in said case with the inner end thereof free for flexing; said clamping means including a clamping member mounted for movements to and from reed clamping position, and spring means adapted to continuously bias said clamping member to clamping position; a push button member movably mounted in said case and being projected outwardly therethrough in position accessible for depression from the exterior of the case, said push button being operatively connected with said movable clamping member and being adapted to actuate said member to non-clamping position by depression of said button; a reed flexing member mounted in said case for movements in either direction transversely of the free end of a reed to be tested and being adapted to engage said free end at one side for flexing thereof by movement in one direction; and spring means associated with said flexing member and being adapted to continuously bias said member in the flexing direction.

5. In an instrument for testing the flexibility of a musical instrument reed, in combination; a case adapted to be grasped in one hand, said case including, a front wall having a dial exposing opening therethrough, a side wall leaving an opening therethrough, and a top wall having a reed receiving opening therethrough; a dial having a scale thereon mounted in said case with said scale being visible through said front wall opening; means for clamping a reed in testing position in said case extended through said top wall opening with the inner end of the reed within the case free for flexing, said clamping means including a push button projected through said side wall opening in position accessible at the exterior thereof for depression by the thumb; biasing means adapted to continuously bias said clamping means to clamping position and said push button to projected position; a reed flexing member mounted in said case for movements in either direction transversely of the free end of a reed for engaging and flexing such free end by movement in one direction; biasing means continuously biasing said flexing member in the flexing direction; an indicator arm pivotally mounted at its lower end in the lower portion of said case and being extended upwardly through the case with its free end over said dial and being swingable across said scale; and means operatively connecting said flexing member with said indicator arm.

6. In an instrument for testing the flexibility of a musical instrument reed, in combination; a case having a reed receiving passage therein; said case providing a reed mounting wall along one side of said passage; a clamp member mounted in said case for movements between a position releasably clamping a reed against said wall with the inner free end of the reed extended inwardly beyond said wall and a position releasing a reed in said passage; a spring engaged with said clamp member adapted to continuously bias said clamp member to clamping position; a manually operable button mounted on said case in engagement with said clamp member for actuating said clamp member to reed releasing position; a reed flexing arm pivotally mounted in said case with the inner end thereof being located opposite the inner end of said reed passage; said flexing arm being formed with a seating surface thereacross for engagement by the inner tip edge and with an abutment portion for engagement with one side of a reed mounted in said passage; and a spring unit engaged with said flexing arm and being adapted to continuously bias said arm in a direction across said passage for flexing the free end of a reed mounted in the passage.

MARIO MACCAFERRI.

References Cited in the file of this patent

UNITED STATES PATENTS

| Number | Name | Date |
|---|---|---|
| 62,775 | Plympton | Mar. 12, 1867 |
| 1,915,289 | Broadus | June 27, 1933 |

FOREIGN PATENTS

| Number | Country | Date |
|---|---|---|
| 636,466 | France | Jan. 12, 1928 |